United States Patent
Ganguli (10) Patent No.: US 7,043,940 B2
(45) Date of Patent: May 16, 2006

(54) METHOD FOR MAKING THIN FUSED GLASS ARTICLES

(75) Inventor: Rahul Ganguli, Camarillo, CA (US)

(73) Assignee: Yazaki Corporation, (JP)

( * ) Notice: Subject to any disclaimer, the term of this patent is extended or adjusted under 35 U.S.C. 154(b) by 524 days.

(21) Appl. No.: 10/390,336

(22) Filed: Mar. 17, 2003

(65) Prior Publication Data

US 2003/0213266 A1 Nov. 20, 2003

Related U.S. Application Data

(60) Provisional application No. 60/364,534, filed on Mar. 15, 2002.

(51) Int. Cl.
*C03B 8/02* (2006.01)
*C03C 19/00* (2006.01)

(52) U.S. Cl. ............................................. 65/17.2; 65/61
(58) Field of Classification Search ................. 65/17.2, 65/61
See application file for complete search history.

(56) References Cited

U.S. PATENT DOCUMENTS

| | | | | |
|---|---|---|---|---|
| 4,776,867 A | * | 10/1988 | Onorato et al. | 65/395 |
| 5,236,483 A | * | 8/1993 | Miyashita et al. | 65/17.2 |
| 5,473,826 A | | 12/1995 | Kirkbir et al. | 34/405 |
| 5,639,517 A | | 6/1997 | Floch et al. | 427/128 |
| 5,914,437 A | * | 6/1999 | Chandross et al. | 65/17.2 |
| 6,669,892 B1 | * | 12/2003 | Ganguli et al. | 264/621 |
| 2002/0098420 A1 | | 7/2002 | Eynon | 430/5 |
| 2002/0157419 A1 | | 10/2002 | Ganguli et al. | 65/17.2 |

FOREIGN PATENT DOCUMENTS

| | | |
|---|---|---|
| JP | 61-236620 | 10/1986 |
| JP | 63-106945 * | 5/1988 |
| JP | 63-129028 | 6/1988 |
| JP | 01-096024 | 4/1989 |
| JP | 1096030 | 4/1989 |
| JP | 1-145332 * | 6/1989 |
| JP | 04-154638 | 5/1992 |
| JP | 7029207 | 1/1995 |
| JP | 7330345 | 12/1995 |
| JP | 2001-154340 | 6/2001 |

* cited by examiner

*Primary Examiner*—Sean Vincent
(74) *Attorney, Agent, or Firm*—Sheppard, Mullin, Richter & Hampton LLP (57) ABSTRACT

A method suited for producing thin fused glass articles includes, in preferred aspects, preparing a dry gel having edges configured to reduce or eliminate warping of the gel during densification of the gel. Preferred aspects include partially densifying the gel, machining the gel into a suitable shape, and fully sintering the gel. The gel preferably is a hybrid incorporating silicon alkoxide and fumed silica particles, and it preferably is machined to have chamfered edges. The method is easier and more cost-effective than those previously known, and it allows for production of high-quality articles for use in, for example, photomask systems as pellicles.

71 Claims, 5 Drawing Sheets

METHOD FOR MAKING THIN FUSED GLASS ARTICLES

Priority is claimed from now abandoned U.S. Provisional Patent Application Ser. No. 60/364,534, filed Mar. 15, 2002, herein incorporated by reference.

BACKGROUND OF THE INVENTION

Extremely thin articles of glass, such as those made from fused silica are used in a number of industries. For example, manufacture of chips used for analyzing DNA material requires fused silica plates thinner than about 0.70 mm. Fused silica plates having thickness between 0.30 to 0.80 mm are particularly suitable for use as pellicles to protect photomasks, which are used in the lithography process for manufacture of semiconductors, from air-borne contaminants. Besides their thinness, these photomask pellicles are large area substrates, typically between 15 cm×15 cm and 25 cm×25 cm in size. As specified by the semiconductor industry, these pellicles also should be made of high purity silica, so that they exhibit high optical transmittance at the ultraviolet wavelengths of interest to the industry, and also so that their transmittance levels do not quickly decrease under prolonged exposure to ultraviolet irradiation.

Published U.S. Patent Application No. 2002/0098420 A1 to Eynon describes a photomask assembly requiring use of a fused silica pellicle. However, the application does not disclose a method of manufacture for such a pellicle. Currently, such thin fused silica plates are made by cutting thick fused silica blanks into thin plates, and then mechanically grinding and polishing these plates to the desired thickness and surface finish. However, the cutting and grinding of silica blanks to produce thin fused silica pieces are difficult processes, due to the fragility and hardness of the silica glass. As a result, this method of manufacture is expensive and time-consuming.

Published Japanese Patent Application No. 2001-154340 to Shibuya et al. discloses an alternative process involving hardening of a thin polysilazane-based polymer on a PET film. The steaming and calcination of this film yield a silica pellicle having a thickness ranging between 0.01 µm and 50 µm.

These thin silica articles also can be fabricated using a sol-gel process, by casting a sol in a mold having a predetermined thickness, gelling this sol, and drying and densifying the gel to obtain a thin silica glass article. Published Japanese Patent Application No. 63-129028 to Yajima et al. describes a sol-gel process in which a silica sol is cast between two parallel plates, gelled, dried, and densified at 1,500° C. to produce glass plates having thickness of 4.0±0.01 mm. Published Japanese Patent Application No. 61-236620 to Mizuno et al. discloses casting, gelation, and drying of silica-based sols on an immiscible liquid, followed by densification of the dried gels at 1,500° C., to obtain glass plates having thickness of 0.95 mm. Published Japanese Patent Application No. 04-154638 to Ando et al. discloses casting a silica-based sol on a flat silicon sheet, followed by gelation and drying of these sols. Densification of these dry gels yields thin-film silica glasses. Published Japanese Patent Application No. 01-096024 to Nakajima describes gelation of a silica-based sol under centrifugal force, followed by drying and densification of the sols to yield thick-walled flat glass.

Thin silica plates having smooth surfaces can be obtained by applying the method disclosed in the Shibuya et al. application or any one of the above-described sol-gel processes. However, such thin articles of silica have been found to typically exhibit substantial warpage during their preparation, particularly during the step of densification (i.e., sintering) to form the glass. This densification generally takes place at temperatures between 1,000° C. and 1,500° C. Particularly for use in large area pellicles, this warpage is considerably beyond the specified limits of the photomask industry. The above-described publications do not disclose a method to prevent such warpage.

It should be appreciated from the foregoing description that there remains a need for a cost-efficient method for fabricating high-quality thin glass articles free of substantial warpage. The present invention fulfills this need and provides further advantages.

SUMMARY OF THE INVENTION

The present invention resides in a method for making a thin glass article by preparing a dry gel having an upper surface, a lower surface, and side edge surfaces between the upper surface and lower surface, in which the distance between the upper surface and the lower surface defines an intermediate thickness, and then fully densifying the dry gel at a full densification temperature to obtain a thin glass article having a final thickness defined by the upper surface and the lower surface. In the method, the step of preparing a dry gel incorporates preparing the dry gel to have side edge surfaces of a shape configured to reduce or eliminate warping of the dry gel during the step of fully densifying the dry gel.

In preferred aspects of the method, the dry gel is prepared using a sol-gel process, followed by drying the gel. Preferably, the dry gel comprises silica, and more particularly silicon alkoxide and fumed silica. The thin glass article preferably has a final thickness of less than 5 mm, more preferably 2 mm, and most preferably 1 mm.

In preferred aspects of the method, the step of preparing a dry gel incorporates partially densifying the dry gel at a partial densification temperature in an atmosphere comprising helium, nitrogen, oxygen, or mixtures of these, and then mechanically shaping the dry gel to have edges configured to reduce or eliminate warping of the dry gel during a step of fully densifying the gel. The partial densification temperature preferably is within the range of 650° C. to 1,200° C., more preferably 1,000° C. to 1,100° C., and most preferably about 1,050° C. The dry gel preferably is heated to the partial densification temperature at a rate between 1° C./hr and 200° C./hr, more preferably between 10° C./hr and 100° C./hr, and most preferably about 25° C./hr. The dry gel preferably is maintained at the partial densification temperature for a duration in the range of 1 hour to 100 hours, more preferably 10 hours to 40 hours, and most preferably 20 hours to 30 hours. The preferred atmosphere for partial densification is a mixture of oxygen and nitrogen or helium having an oxygen concentration between 3% and 20%, and most preferably about 7%. In this aspect of the method, the step of mechanically shaping preferably includes mechanically reducing the intermediate thickness of the dry gel, and also machining at least one of the side edge surfaces of the dry gel to have a shape configured to reduce or eliminate warping of the dry gel during the step of fully densifying the dry gel.

In another preferred aspect of the method, the step of preparing a dry gel incorporates casting the gel in a mold having dimensions such that at least one of the side edge surfaces of the resulting dry gel has a shape configured to reduce or eliminate warping of the dry gel during the step of fully densifying the dry gel.

In the method of the present invention, at least one side edge surface of the gel preferably is shaped such that the upper and lower surfaces of the gel do not connect to the side edge surface at an angle of about 90°, and more preferably do connect at an angle of less than about 85° or greater than about 95°. In a preferred aspect of the method, a side edge surface is shaped as a chamfered shape. The chamfered shape preferably is characterized by a chamfering width of less than about 20 mm, more preferably less than about 10 mm and/or a chamfering angle of between 5° and 85°, more preferably 15° and 75°, and most preferably about 45°.

In an additional preferred aspect of the method, a side edge surface is shaped as a grooved shape characterized by a grooving depth, preferably of less than about 20 mm, more preferably less than about 10 mm, and/or a grooving width preferably greater than about 0.1 mm, more preferably greater than about 0.5 mm, and most preferably greater than about 1 mm. The grooved shape also preferably is characterized by a chamfering angle of between 5° and 175°, more preferably 20° and 160°, and most preferably between 45° and 135°.

In additional preferred aspects of the method, a side edge surface is shaped as a convex or concave shape preferably having a rounding radius between about 0.1 mm and about one-half of the intermediate thickness of the dry gel, more preferably between about 0.5 mm and about one-half of the intermediate thickness, and most preferably about 1 mm and about one-half of the intermediate thickness.

Preferred aspects of the method of the present invention further can incorporate any of the following steps: removing hydrocarbons from the dry gel by heating the dry gel at a temperature between 150° C. and 300° C., halogenation of the dry gel using a halogenation agent at a temperature between 650° C. and 1,200° C. after the step of removing hydrocarbons; and oxygenation of the dry gel at a temperature between 800° C. and 1,200° C. after the step of halogenation.

A preferred full densification temperature of the method is within the range of 1,300° C. to 1,450° C., more preferably 1,350° C. to 1,400° C., and most preferably about 1,370° C. The dry gel is heated to the full densification temperature preferably at rate of between 1° C./hr and 300° C./hr, and most preferably about 25° C./hr. The dry gel preferably is maintained at the full densification temperature for a duration in the range of thirty minutes to 10 hours, and most preferably about 4 hours. The step of fully densifying preferably takes place in a zone of a furnace having a temperature variation of less than about ±5° C., more preferably about ±1° C., and under a pressure of less than about 1,000 mTorr, more preferably less than about 100 mTorr, and most preferably less than about 1 mTorr.

A preferred aspect of the method further incorporates a step of flattening the thin glass article by heating the thin glass article to a flattening temperature after the step of fully densifying the dry gel. The flattening temperature preferably is within the range of 1,650° C. to 2,200° C., more preferably 1,700° C. to 1,850° C., and most preferably about 1,750° C. The glass article preferably is heated to this flattening temperature at a rate within the range of 1° C./hr and 1,000° C./hr, more preferably 200° C./hr and 400° C./hr, and most preferably about 300° C./hr, and maintained at this temperature for a duration in the range of 6 minutes to 12 hours, more preferably 1 hour to 8 hours, and most preferably about 5 hours. The step of flattening preferably takes place in a zone of a furnace having a temperature variation of less than about ±5° C., and most preferably about ±1° C.

In particular, a preferred aspect of the present invention resides in a method for making a thin fused silica article incorporates the following steps:

1) preparing a dry gel comprising fused silica using a sol-gel method, the dry gel having an upper surface, a lower surface, and side edge surfaces between the upper surface and lower surface;

2) partially densifying the dry gel by heating the dry gel to a temperature of about 1,050° C. at a heating rate of about 25° C./hr, and maintaining the temperature of the dry gel at about 1,050° C. for about 24 hours in an atmosphere of about 7% oxygen and about 93% helium;

3) machining the side edge surfaces of the dry gel, so that the side edge surfaces each have a chamfered shape, the chamfered shape characterized by a chamfering angle of about 20° and a chamfering width of about 10 mm;

4) fully densifying the gel at a pressure of less than about 1 mTorr by heating the gel to about 1,370° C. at a heating rate of about 25° C./hr, and then maintaining the temperature of the gel at about 1,370° C. for about 4 hours in a zone in which temperature variation is less than about ±1° C., to form the thin fused silica article; and 5) flattening the thin fused silica article by heating the article to a temperature of about 1,750° C. at a heating rate of about 300° C./hr and maintaining the temperature of the gel at 1,750° C. for about 5 hours.

Other features and advantages of the present invention should become apparent from the following detailed description of the preferred aspects of the method.

DETAILED DESCRIPTION OF THE PREFERRED METHOD

The present invention resides in a method for making thin articles of glass, such as those made from fused silica. The method provides for articles of high quality, which are produced less expensively than previously known methods. In particular, the method allows for reduction or elimination of warpage that commonly occurs in the production of such thin glass articles.

A preferred aspect of the method incorporates preparing a silica sol using a sol-gel process, forming the sol into a thin gel having a shape configured to reduce or eliminate warpage during densification of the gel, and fully densifying the gel. Preferred aspects of the method incorporate steps of partially densifying the gel, machining the partially densified silica gel to have a thickness and edge shape configured to reduce warpage and meet the size requirements of the final article, and fully densifying the machined gel to produce the silica article. Because sol-gel processing allows direct manufacture of thin silica gels by casting sols into molds having predetermined thickness and shape, material losses which can arise due to cutting can be minimized, resulting into cost savings. Additionally, machining of the partially densified silica gel is much easier than machining a fully densified glass article, resulting in reduced machining cost. Also, because little or no warpage occurs during process steps following the machining step, high quality articles meeting the requirements of the photomask industry can be produced.

In a preferred aspect of the method of the present invention, a sol is prepared using hydrolyzed silicon alkoxide and fine silica particles (also known as fumed silica, e.g. Aerosil OX-50 manufactured by Degussa Co.) as described in published U.S. patent application 2002/0157419 A1 to Ganguli et. al., herein incorporated by reference. After this preparation, the sol then is cast in a mold for gelation. After gelation of the sol, the gel can shrink during subsequent processing steps, including aging, drying, halogenation, oxygenation, and densification. The causes of this shrinkage are well described in the sol-gel art. Although the level of shrinkage varies depending on the sol composition and the conditions used for processing of the wet gel, this level can be experimentally determined for a particular combination of sol composition and gel processing conditions. Since the level of shrinkage is thereby predictable for a particular gel and set of processing conditions, the mold can be designed to have preferred dimensions and edge shape such that the final densified glass article has the required final dimensions. This allows for production of the final article with minimal material loss and induction of warpage.

The wet gel obtained by gelation of this sol then is dried preferably using the technique described in U.S. Pat. No. 5,473,826 to Kirkbir et. al., herein incorporated by reference. This sub-critical drying process minimizes shrinkage of the gel and decrease in pore size, and it also prevents cracking of the wet gel during drying. Because the gel does not significantly shrink during drying, crack-free monolithic porous articles having specified pore structure and desired shapes and dimensions can be easily obtained.

In a preferred aspect of the present invention, the method incorporates a step of hydrocarbon removal after the drying step described above. This hydrocarbon removal prevents premature cracking of the silica article. In the step, hydrocarbons and moisture adsorbed on the dry gel surface are removed by slowly heating the dry gel to a temperature within the range of 150° C. to 300° C., using conventional methods. Addition of this step leads to a higher number of articles produced for a given amount of sol, thereby decreasing manufacturing costs.

In a particularly preferred aspect of the present invention, the method further incorporates a step of halogenation after the steps of drying and hydrocarbon removal described above. In the step, the dry gel is halogenated using halogen agents, such as chlorine or fluorine, to remove hydroxyl (OH) ions and other impurities. Addition of this step allows for production of articles having higher transmittance levels at wavelengths of ultraviolet radiation. The step of halogenation preferably is performed at a temperature within the range of 650° C. to 1,200° C., using conventional methods.

In another preferred aspect of the present invention, the method further incorporates a step of oxygenation after the steps of drying, hydrocarbon removal, and halogenation described above. In this step, the halogenated gel is oxygenated using conventional methods to remove halogen species remaining in the gel. This step results in a further increase of the transmittance levels of the articles at wavelengths of ultraviolet radiation. The oxygenation step preferably is performed at a temperature within the range of 800° C. to 1,200° C.

In a preferred aspect of the method of the present invention, after the steps described above, the dried gel is partially densified to provide sufficient strength and to develop a desired pore structure necessary for easy machining without breakage or substantial material losses. This partial densification is performed at a temperature within the range of 650° C. to 1,200° C., more preferably 1,000° C. to 1,100° C., and most preferably at about 1,050° C. The partial densification is performed in a controlled atmosphere of helium, oxygen, nitrogen, or mixtures of these. Preferably, this atmosphere is a mixture of oxygen with either nitrogen or helium, the mixture having an oxygen concentration between 3% and 20%, and most preferably about 7%. The gel is heated to the partial densification temperature at a rate between 1° C./hr and 200° C./hr. Preferably, the heating rate is between 10° C./hr and 100° C./hr, and most preferably about 25° C./hr. The gel is held at the partial densification temperature for a predetermined dwell time that varies based on the partial densification temperature, to cause linear shrinkage of more than 10%, and more preferably more than 25%, based on the initial thickness of the gel immediately after gelation of the sol. This dwell time preferably is between 1 hour and 100 hours, more preferably between 10 hours and 40 hours, and most preferably between 20 hours and 30 hours.

Figure 1:
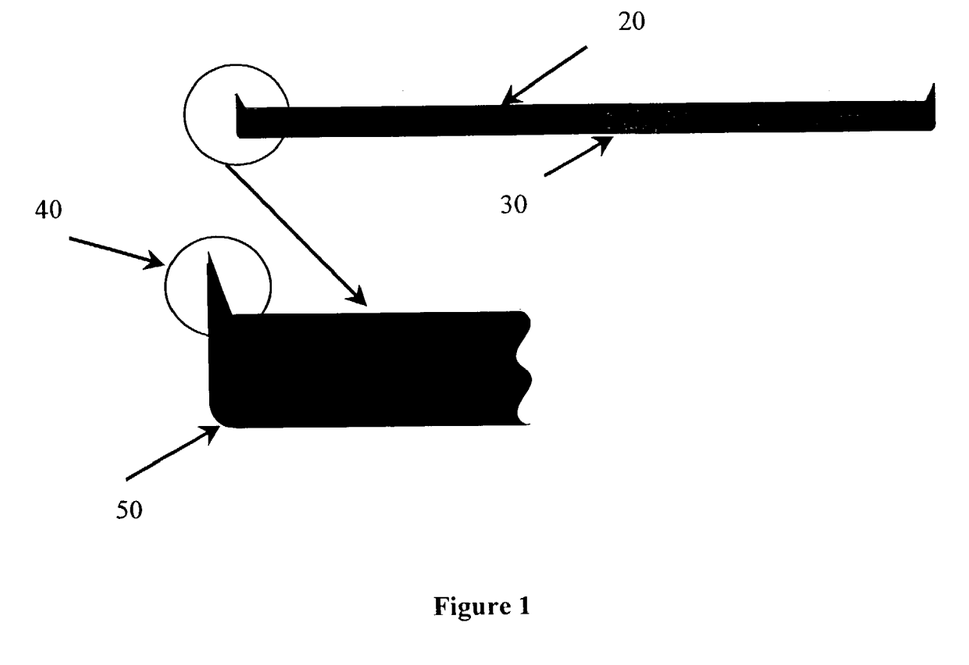
FIG. 1 is an elevational cross-sectional view and an enlarged portional view of a partially densified gel before the step of machining in a preferred aspect of the method of the present invention.

After the step of partial densification, the partially densified gel then is machined to the appropriate dimensions for the particular use for which the final silica article is intended. This machining is configured not only to reduce the thickness of the gel, but also to shape the edges of the gel to prevent warpage resulting from the step of full densification. As illustrated in FIG. 1, in the absence of any machining, a partially densified gel 10 has a meniscus edge 40 at its upper surface 20. This meniscus edge is formed during gelation, due to surface tension of the sol. A partially densified gel also has a slightly rounded edge 50 at its lower surface 30, which is caused by filleting of the mold corners.

Figure 2:
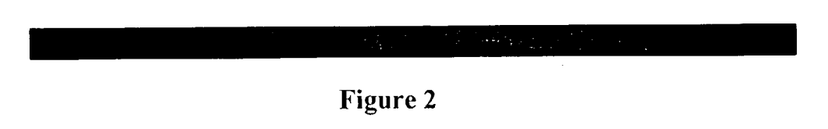
FIG. 2 is an elevational cross-sectional view of a partially densified gel after the step of machining in a preferred aspect of the method of the present invention.
Figure 3:
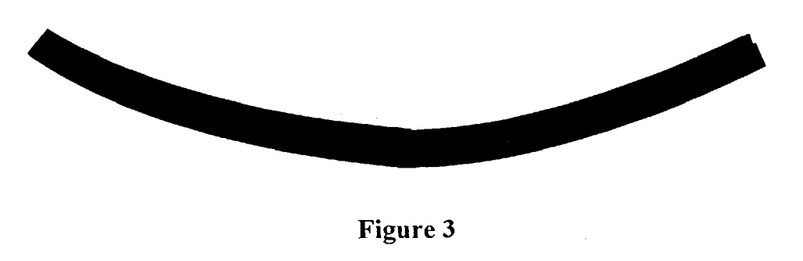
FIG. 3 is an elevational cross-sectional view of a glass article having curled edges after densification.
Figure 4:
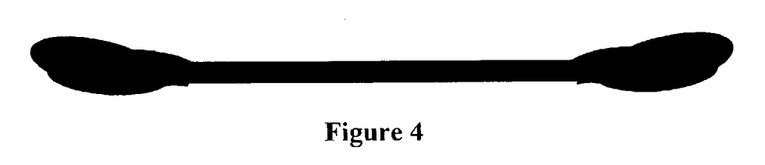
FIG. 4 is an elevational cross-sectional view of a glass article having beaded edges after flattening.
Figure 5:
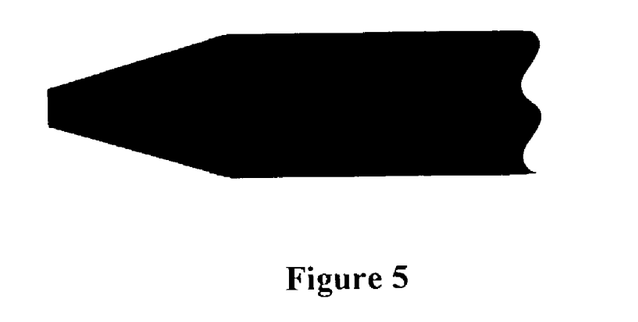
FIG. 5 is an elevational cross-sectional view of exemplary chamfered edge surfaces produced in preferred aspects of the method of the present invention.

As a first stage of the step of machining, both the upper and lower surfaces of the partially densified gel are ground to reduce the gel's thickness. The partially densified gel preferably should be ground to a thickness roughly twice that of the final fused silica article desired. As illustrated in FIG. 2, this grinding removes the meniscus edge from the upper surface and the slightly rounded edge from the lower surface, resulting in formation of a flat upper surface and a flat lower surface, and side edge surfaces connecting the upper surface and the lower surface at an angle of about 90°. If this article then is fully densified, it curls into an arch, as is illustrated in FIG. 3. This type of warping cannot be flattened by heating the glass article to an elevated temperature (for example, to the liquidus temperature of the glass at which the glass starts to flow—about 1,720° C. for silica), because the flow of glass during attempted flattening causes accumulation of material at the side edge surfaces of the article, as well as further warpage that damages large sections of the article, rendering the article useless. This condition is illustrated in FIG. 4.

As a result, in this aspect of the invention, after grinding to reduce the partially densified gel's thickness, the edges of the thin silica gel also should be machined to be in a shape configured to eliminate gel warpage during the step of full densification. In general, to eliminate warpage the edges should be shaped such that the side edge surfaces connecting two opposite and parallel surfaces (i.e. upper and lower surface edges) should not be perpendicular to the upper and lower surfaces along their entire length. The linear (i.e. straight) or non-linear (i.e. curved) deviations from this perpendicularity will aid in preventing or minimizing warpage. That is, any geometrical deviation from an angle of 90°, preferably a deviation greater than 5° resulting in angles of 85° or less and 95° or greater, along the side edge surfaces connecting the upper and lower surfaces are within the scope of this invention. Edge shapes particularly suitable for eliminating this warpage that can be formed as part of the method of the present invention include those known in the machining art, such as chamfered, grooved, concave round, and convex round edges. Examples of these are illustrated in FIGS. 5 to 8. Preferred aspects of the present method incorporate machining of the edges of both the upper and lower surfaces of the partially densified gel should incorporate these shapes.

Further detail of the exemplary dimensions discussed below are illustrated in FIGS. 9 to 12. The chamfered edge shape is the most preferred for use within the method of the present invention, because it is easy to machine and provides for good elimination of warpage during full densification. The chamfering width 60 preferably is less than 20 mm, and most preferably less than 10 mm. The chamfering angle 70 preferably is within the range of 5° to 85°, more preferably 15° to 75°, and most preferably about 45°.

Figure 6:
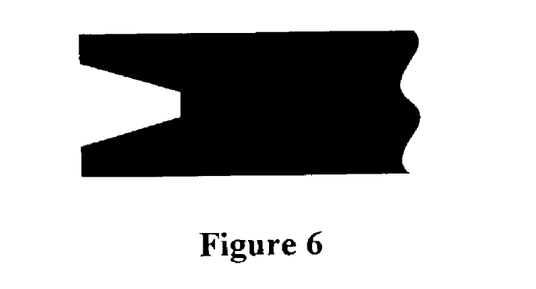
FIG. 6 is an elevational cross-sectional view of exemplary grooved edge surfaces produced in preferred aspects of the method of the present invention.
Figure 7:
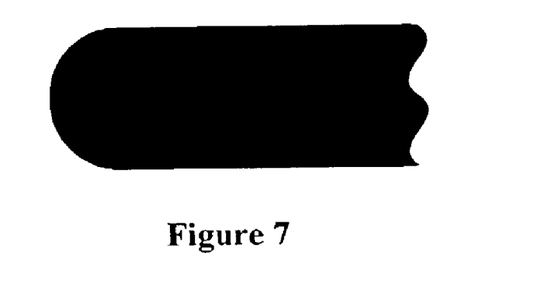
FIG. 7 is an elevational cross-sectional view of exemplary convex edge surfaces produced in preferred aspects of the method of the present invention.
Figure 8:
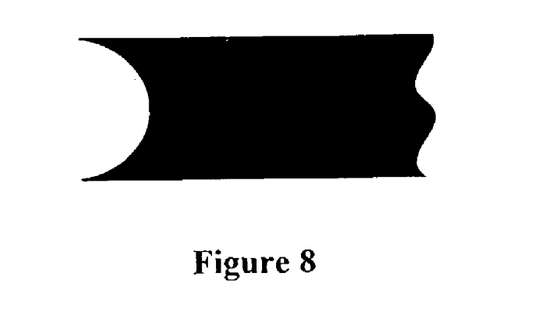
FIG. 8 is an elevational cross-sectional view of exemplary concave edge surfaces produced in preferred aspects of the method of the present invention.
Figure 9:
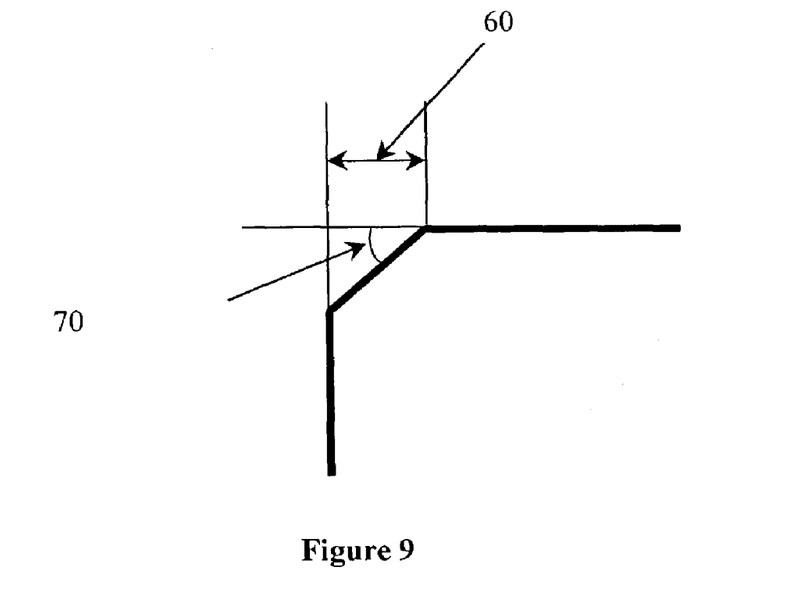
FIG. 9 is a schematic representation of the dimensional definitions for chamfered edge surface shapes in preferred aspects of the method of the present invention.
Figure 10:
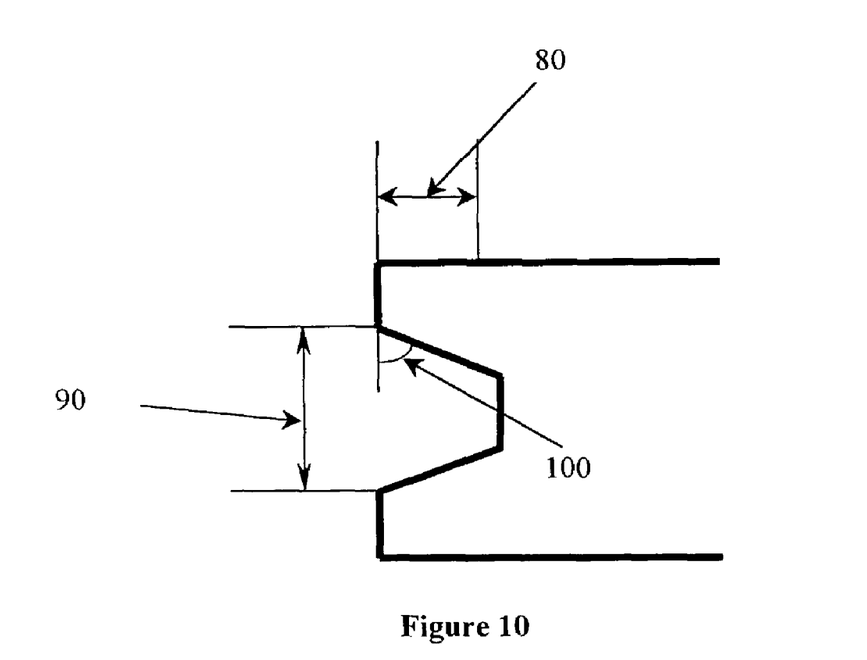
FIG. 10 is a schematic representation of the dimensional definitions for grooved edge surface shapes in preferred aspects of the method of the present invention.
Figure 11:
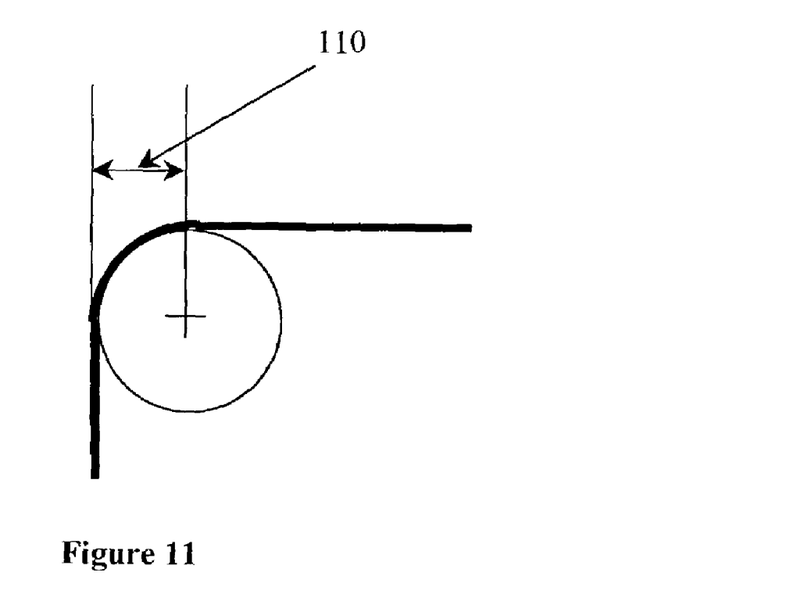
FIG. 11 is a schematic representation of the dimensional definitions for convex edge surface shapes in preferred aspects of the method of the present invention.
Figure 12:
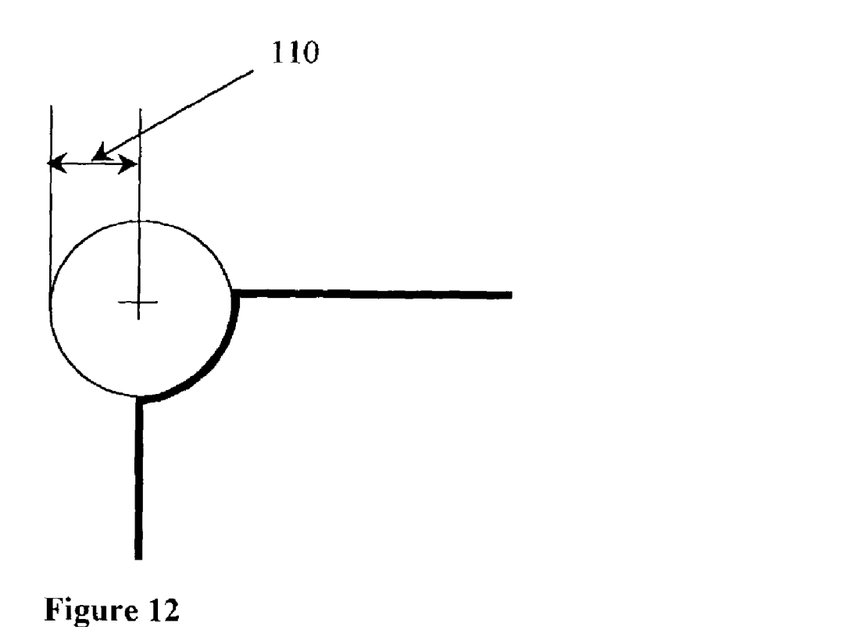
FIG. 12 is a schematic representation of the dimensional definitions for concave edge surface shapes in preferred aspects of the method of the present invention.

Another edge shape suitable for use with the method of the present invention is a grooved edge. An example of a grooved edge is shown in FIG. 6, and further detail of the exemplary dimensions discussed below are illustrated in FIG. 10. The grooving depth 80 preferably is less than 20 mm, and most preferably less than 10 mm. The grooving width 90 preferably is greater than 0.1 mm, more preferably greater than 0.5 mm, and most preferably greater than 1 mm. The grooving angle 100 is within the range of 5° to 175°, more preferably 20° to 160°, and most preferably 45° to 135°. Grooved edges centered or off-centered with respect to the geometrical center of the side edge connecting the upper and lower surface edges also are suitable for use within the method of the present invention.

As discussed above and as shown in FIGS. 7, 8, 11 and 12, a curved convex or concave edge shape also can be used in the method of the present invention. If one of these shapes is prepared, the rounding radius 110 for a convex edge or a concave edge preferably is larger than 0.1 mm, more preferably larger than 0.5 mm, and most preferably larger than 1 mm. The maximum rounding radius is one-half the width of the thickness of the partially densified gel. The center of the rounding radius is located at the edge of the article so that a full arch at the edge is obtained after machining. Off-centered concave or convex rounding is also within the scope of this invention. Each of these edge shapes provides for elimination of warpage during the full densification step.

In additional aspects of the method of the present invention, the steps of partial densification and machining can be partly or completely avoided if the step of preparing the dry gel incorporates a molding process known as a "near-net-shaping" or "net-shaping" process, as commonly referred to in the sol-gel industry. These molding processes can be used after experimental determination of the level of shrinkage of the particular gel caused by processing from gelation to full densification. The gel, formed by gelation of sol, immediately assumes the inner dimensions of the mold. Once the level of shrinkage caused by processing is experimentally determined, the final dimensions of this gel after densification can thereby be predicted. In this aspect of the method of the present invention, sols are cast into molds having thickness, width, and edge shapes determined by the above-described shrinkage experimentation, such that when the gels obtained from such molds are dried and then directly (i.e., without intermediate machining) fully densified, they yield articles having dimensions identical to that required, without need for the steps of partial densification and machining of the articles. Use of these aspects of the method are further enhanced if the sol is constricted between mold surfaces, such as in an injection molding process, to prevent the formation of meniscus edges at the upper gel surfaces.

The gel having the required thickness and edge shape, whether from machining, near-net-shaping, or net-shaping, next is heated to fully densify the gel into a glass article, preferably in a graphite furnace on a porous graphite support. This full densification is performed by heating the gel, from an ambient temperature of 20° C. to a temperature within the range of 1,300° C. to 1,450° C., more preferably 1,350° C. to 1,400° C., and most preferably about 1,370° C. This temperature is achieved using a heating rate of between 1° C./hr and 300° C./hr, and most preferably about 25° C./hr. The dwell time for this step at the fill densification temperature varies by densification temperature used, and it is between thirty minutes and 10 hours. Most preferably, the dwell time is about 4 hours. This full densification step is performed under vacuum so that a uniform temperature profile exists around the glass article, thereby further minimizing the possibility of warping of the article during full densification. The full densification pressure is preferably below about 1,000 mTorr, more preferably below about 100 mTorr, and most preferably below about 1 mTorr. The zone of the furnace in which the gel is placed for full densification should be controlled to have a temperature variation during the densification step of less than ±5° C., and most preferably less than ±1° C. to minimize warping of the article. After full densification is completed, the article has shrunk to its final size. At this point, the article essentially is non-porous when this porosity is measured using conventional techniques, such as nitrogen adsorption or mercury intrusion porosimetry.

After full densification is completed, a thin silica glass article is produced. The flatness of an article produced using the method can be measured to determine whether it is acceptable for use in a particular industry. To do this, the surface of the article is marked by drawing horizontal and vertical lines, parallel to the side surfaces, at 25 mm intervals to form a 6×6 grid. This section of the surface should exclude the surface of the shaped edges. The thickness of the article at each grid point is measured using a gauge having an accuracy of ±5 $10^{-6}$ mm. Then, the article is placed on an optical flat having a flatness level of less than 63.3 nm. Finally, a height gauge having an accuracy of ±5 $10^{-6}$ mm is placed on the optical flat, and the height of the article at each grid point is measured. The difference between the measured height and the measured thickness determines the level of the warpage at each grid point. The value of the maximum difference is reported as the level of flatness of the article. Using the method of the present invention, flatness levels better than 1 mm can be obtained after full densification.

In a preferred aspect of the method of the present invention, after the full densification step described above the glass article is further flattened by heating the article preferably on a porous graphite support to a temperature within the range of 1,650° C. to 2,200° C., more preferably 1,700° C. to 1,850° C., and most preferably to about 1,750° C., using a heating rate of between 1° C./hr and 1,000° C./hr, more preferably between 200° C./hr and 400° C./hr, and most preferably about 300° C./hr. The dwell times at the preferred flattening temperature described above are between 0.1 hour and 12 hours, more preferably between 1 hour and 8 hours, and most preferably about 5 hours, respectively. As for the step of full densification, the zone in which the glass is placed for flattening should have a temperature variation of less than ±5° C., and most preferably less than ±1° C., to minimizing warping. The flatness of the article, obtained after the flattening step, is measured by the method described above. Using the method of the present invention, flatness levels better than 0.7 mm can be obtained after flattening as described above.

After the step of full densification and, if present, flattening, the shaped edges of the article are cut away from the article to yield a final article having the intended shape. This article can be used as manufactured, or it can be polished for more demanding optical applications. The method of the present invention, particularly after the steps of hydrocarbon removal, halogenation, and oxygenation, allows for production of thin silica articles having exceptionally high optical transmittance. The dry gel also can be partially densified without incorporating the steps of hydrocarbon removal, halogenation, and oxygenation into the method, to decrease manufacturing costs. However, because such articles have lower transmittance levels, particularly at the ultraviolet range, due to their higher impurity levels, they are more suitable for less demanding optical applications than photomask substrates, such as articles for use in cover slides for fluorescence spectroscopy. Flattening, while not required, also is preferred, because it can remove any slight warpage that may be caused by full densification, even when edge shaping within the scope of the present invention is used, to obtain thin silica articles for demanding applications requiring extremely tight flatness specifications, such as for use in pellicles. For other applications having wider tolerance levels, this step also can be avoided to decrease manufacturing costs.

The method of the present invention is not restricted to manufacture of thin articles made of silica glass. Other glasses that can be manufactured using sol-gel process, such as $TiO_2$—$SiO_2$, $Al_2O_3$—$SiO_2$, or $GeO_2$—$SiO_2$ glasses, also can be prepared using the method of the present invention.

The method of the present invention can be better understood by way of the following illustrative examples.

EXAMPLE 1

This example illustrates a preferred aspect of the method of the present invention incorporating partial densification and machining. A sol was prepared using the method disclosed in published U.S. patent application 2002/0157419 A1 to Ganguli et. al. This sol was cast into a square mold having dimensions of 27.5 cm×27.5 cm. The sol was cast to a height of 18 mm, gelled, and then was subcritically dried without formation of any cracks, according to techniques disclosed in U.S. Pat. No. 5,473,826 to Kirkbir et al.

To produce partial densification of the dry get, the gel was placed in an electrically heated SiC furnace having a quartz enclosure for the partial densification step. The gel was first heated from a temperature of about 20° C. to about 170° C. at a heating rate of about 15° C./hr in an atmosphere containing about 7% oxygen and about 93% nitrogen. Then, hydrocarbons and moisture adsorbed on the dry gel surface were removed in the same atmosphere by further heating the dry gel from about 170° C. to about 250° C. at a heating rate of about 5° C./hr. The dry gel then was held at about 250° C. for about 12 hours.

After the hydrocarbon removal step, the dry gel was heated in the same atmosphere at a rate of about 25° C./hr to a temperature of about 650° C. The gel was then hologenated by heating it from about 650° C. to about 1,050° C. at a rate of about 25° C./hr in an atmosphere of about 33% chlorine and about 67% helium. The gel was held at about 1,050° C. for about 1 hour for further halogenation. Then, the atmosphere was changed to be about 7% oxygen and about 93% helium, and the gel was partially densified at this temperature and atmosphere for about 24 hours. After the partial densification was completed, the gel was ground in a polishing wheel down to a thickness of about 3 mm. Then, the edges of the gel were machined to have chamfered edges. The chamfering angle was about 20° and the chamfering width was less than about 10 mm.

The machined and the partially densified dry gel then was fully densified by placing it in a graphite furnace on a porous graphite support and was heated from an ambient temperature of about 20° C. to a temperature of about 1,370° C. at a heating rate of about 25° C./hr, and kept at this temperature for about 4 hours to fully densify the dry gel into a glass article. The full densification was performed at a pressure of 1 mTorr. The hot zone where the dry gel was fully densified had a temperature variation of less than ±1° C. The flatness of the as densified article was better than 1.0 mm.

Finally, after the full densification step, the glass article was heated to about 1,750° C. at a heating rate of about 300° C./hr on a porous graphite support and kept at this temperature for about 5 hours. The thickness of the final glass article was about 0.75 mm. The flatness of the as flattened article was better than 0.7 mm.

COMPARATIVE EXAMPLE 1

In this comparative example, the gel was prepared, dried, and its hydrocarbons and moisture were removed as described in Example 1. The dry gel then was partially densified at about 400° C. for about 24 hours. Attempts to machine the partially densified gel resulted in fracture of the gel. Thus, a thin silica plate having the desired dimensions could not be obtained. This example demonstrated that if the gels are partially densified at temperatures lower than those within the scope of the method of the present invention, the gels obtained lack sufficient strength for machining.

COMPARATIVE EXAMPLE 2

A glass article was prepared as described in Example 1 but, as illustrated in FIG. 2, with no machining at its edges. After densification, the edges of this glass article was curled up, introducing warpage in the plate, as illustrated in FIG. 3. The warped glass then was further heated at a temperature of about 1,750° C. for about 5 hours as described in Example 1. The edges of the glass were beaded up, introducing local warpage at the edges of the article, as shown in FIG. 4.

Although the invention has been described in detail with reference only to the preferred method, those of ordinary skill in the art will appreciate that various modifications can be made without departing from the invention. Accordingly, the invention is identified by the following claims.

I claim:

1. A method for making a thin glass article, comprising:
preparing a dry gel having an upper surface, a lower surface, and side edge surfaces between the upper surface and lower surface, wherein the distance between the upper surface and the lower surface defines an intermediate thickness; and
fully densifying the dry gel at a full densification temperature to obtain a thin glass article having a final thickness defined by the upper surface and the lower surface,
wherein the step of preparing a dry gel comprises preparing a dry gel having side edge surfaces of a shape configured to reduce or eliminate warping of the dry gel during the step of fully densifying the dry gel.

2. A method as defined in claim 1, wherein the step of preparing a dry gel comprises:
preparing a gel using a sol-gel process; and
drying the gel.

3. A method as defined in claim 1, wherein the dry gel comprises silica.

4. A method as defined in claim 3, wherein the dry gel comprises silicon alkoxide and fumed silica.

5. A method as defined in claim 1, wherein the thin glass article has a final thickness of less than 5 mm.

6. A method as defined in claim 5, wherein the thin glass article has a final thickness of less than 2 mm.

7. A method as defined in claim 6, wherein the thin glass article has a final thickness of less than 1 mm.

8. A method as defined in claim 1, wherein the step of preparing a dry gel comprises:
partially densifying the dry gel at a partial densification temperature in an atmosphere comprising helium, nitrogen, oxygen, or mixtures thereof, and
mechanically shaping the dry gel to have edges configured to reduce or eliminate warping of the dry gel during a step of fully densifying the gel.

9. A method as defined in claim 8, wherein the partial densification temperature is within the range of 650° C. to 1,200° C.

10. A method as defined in claim 9, wherein the partial densification temperature is within the range of 1,000° C. to 1,100° C.

11. A method as defined in claim 10, wherein the partial densification temperature is about 1,050° C.

12. A method as defined in claim 8, wherein the step of partially densifying comprises heating the dry gel to the partial densification temperature at a rate between 1° C./hr and 200° C./hr.

13. A method as defined in claim 12, wherein the step of partially densifying comprises heating the dry gel to the partial densification temperature at a rate between 10° C./hr and 100° C./hr.

14. A method as defined in claim 13, wherein the step of partially densifying comprises heating the dry gel to the partial densification temperature at a rate of about 25° C./hr.

15. A method as defined in claim 8, wherein the step of partially densifying comprises maintaining the dry gel at the partial densification temperature for a duration in the range of 1 hour to 100 hours.

16. A method as defined in claim 15, wherein the step of partially densifying comprises maintaining the dry gel at the partial densification temperature for a duration in the range of 10 hours to 40 hours.

17. A method as defined in claim 16, wherein the step of partially densifying comprises maintaining the dry gel at the partial densification temperature for a duration in the range of 20 hours to 30 hours.

18. A method as defined in claim 8, wherein the atmosphere consists essentially of a mixture of oxygen and nitrogen or helium, the mixture having an oxygen concentration between 3% and 20%.

19. A method as defined in claim 18, wherein the mixture has an oxygen concentration of about 7%.

20. A method as defined in claim 8, wherein the step of mechanically shaping comprises mechanically reducing the intermediate thickness of the dry gel.

21. A method as defined in claim 8, wherein the step of shaping comprises machining at least one of the side edge surfaces of the dry gel to have a shape configured to reduce or eliminate warping of the dry gel during the step of fully densifying the dry gel.

22. A method as defined in claim 1, wherein the step of preparing a dry gel comprises casting a gel in a mold having dimensions such that at least one of the side edge surfaces of the dry gel has a shape configured to reduce or eliminate warping of the dry gel during the step of fully densifying the dry gel.

23. A method as defined in claim 1, wherein the at least one side edge surface configured to reduce or eliminate warping is shaped such that the upper and lower surfaces do not connect to the side edge surface at an angle of about 90°.

24. A method as defined in claim 23, wherein the at least one side edge surface configured to reduce or eliminate warping is shaped such that the upper and lower surfaces connect to the side edge surface at an angle of less than about 85° or greater than about 95°.

25. A method as defined in claim 23, wherein the at least one side edge surface configured to reduce or eliminate warping is shaped as a chamfered shape.

26. A method as defined in claim 25, wherein the chamfered shape is characterized by a chamfering width of less than about 20 mm.

27. A method as defined in claim 26, wherein the chamfered shape is characterized by a chamfering width of less than about 10 mm.

28. A method as defined in claim 25, wherein the chamfered shape is characterized by a chamfering angle of between 5° and 85°.

29. A method as defined in claim 28, wherein the chamfered shape is characterized by a chamfering angle of between 15° and 75°.

30. A method as defined in claim 29, wherein the chamfered shape is characterized by a chamfering angle of about 45°.

31. A method as defined in claim 23, wherein the at least one side edge surface configured to reduce or eliminate warping is shaped as a grooved shape.

32. A method as defined in claim 31, wherein the grooved shape is characterized by a grooving depth of less than about 20 mm.

33. A method as defined in claim 32, wherein the grooved shape is characterized by a grooving depth of less than about 10 mm.

34. A method as defined in claim 33, wherein the grooved shape is characterized by a grooving width of greater than about 0.1 mm.

35. A method as defined in claim 34, wherein the grooved shape is characterized by a grooving width of greater than about 0.5 mm.

36. A method as defined in claim 35, wherein the grooved shape is characterized by a grooving width of greater than about 1 mm.

37. A method as defined in claim 31, wherein the grooved shape is characterized by a grooving angle of between 5° and 175°.

38. A method as defined in claim 37, wherein the grooved shape is characterized by a grooving angle of between 20° and 160°.

39. A method as defined in claim 38, wherein the grooved shape is characterized by a grooving angle of between 45° and 135°.

40. A method as defined in claim 23, wherein the at least one side edge surface configured to reduce or eliminate warping is shaped as a convex shape or a concave shape.

41. A method as defined in claim 40, wherein the convex shape or concave shape has a rounding radius between about 0.1 mm and about one-half of the intermediate thickness of the dry gel.

42. A method as defined in claim 41, wherein the convex shape or concave shape has a rounding radius between about 0.5 mm and about one-half of the intermediate thickness of the dry gel.

43. A method as defined in claim 42 wherein the convex shape or concave shape has a rounding radius between about 1 mm and about one-half of the intermediate thickness of the dry gel.

44. A method as defined in claim 1, wherein the step of preparing a dry gel comprises removing hydrocarbons from the dry gel by heating the dry gel at a temperature between 150° C. and 300° C.

45. A method as defined in claim 44, wherein the step of preparing a dry gel further comprises halogenation of the dry gel using a halogenation agent at a temperature between 650° C. and 1,200° C. after the step of removing hydrocarbons.

46. A method as defined in claim 45, wherein the step of preparing a dry gel further comprises oxygenation of the dry gel at a temperature between 800° C. and 1,200° C. after the step of halogenation.

47. A method as defined in claim 1, wherein the full densification temperature is within the range of 1,300° C. to 1,450° C.

48. A method as defined in claim 47, wherein the full densification temperature is within the range of 1,350° C. to 1,400° C.

49. A method as defined in claim 48, wherein the full densification temperature is about 1,370° C.

50. A method as defined in claim 1, wherein the step of fully densifying comprises heating the gel to the full densification temperature at rate of between 1° C./hr and 300° C./hr.

51. A method as defined in claim 50, wherein the step of fully densifying comprises heating the gel to the full densification temperature at a rate of about 25° C./hr.

52. A method as defined in claim 1, wherein the step of fully densifying comprises maintaining the dry gel at the full densification temperature for a duration in the range of thirty minutes to 10 hours.

53. A method as defined in claim 52, wherein the step of fully densifying comprises maintaining the dry gel at the full densification temperature for a duration of about 4 hours.

54. A method as defined in claim 1, wherein the step of fully densifying comprises heating the gel in a zone of a furnace having a temperature variation of less than about ±5° C.

55. A method as defined in claim 54, wherein the step of fully densifying comprises heating the gel at the densification temperature in a zone of a furnace having a temperature variation of less than about ±1° C.

56. A method as defined in claim 1, wherein the step of fully densifying comprises heating the gel under a pressure of less than about 1,000 mTorr.

57. A method as defined in claim 56, wherein the step of fully densifying comprises heating the gel under a pressure of less than about 100 mTorr.

58. A method as defined in claim 57, wherein the step of fully densifying comprises heating the gel under a pressure of less than about 1 mTorr.

59. A method as defined in claim 1, further comprising a step of flattening the thin glass article by heating the thin glass article to a flattening temperature after the step of fully densifying the dry gel.

60. A method as defined in claim 59, wherein the flattening temperature is within the range of 1,650° C. to 2,200° C.

61. A method as defined in claim 60, wherein the flattening temperature is within the range of 1,700° C. to 1,850° C.

62. A method as defined in claim 61, wherein the flattening temperature is about 1,750° C.

63. A method as defined in claim 59, wherein the step of flattening comprises heating the thin glass article to the flattening temperature at a rate within the range of 1° C./hr and 1,000° C./hr.

64. A method as defined in claim 63, wherein the step of flattening comprises heating the thin glass article to the flattening temperature at a rate within the range of 200° C./hr and 400° C./hr.

65. A method as defined in claim 64, wherein the step of flattening comprises heating the thin glass article to the flattening temperature at a rate of about 300° C./hr.

66. A method as defined in claim 59, wherein the step of flattening comprises heating the thin glass article in a zone of a furnace having a temperature variation of less than about ±5° C.

67. A method as defined in claim 66, wherein the step of flattening comprises heating the thin glass article in a zone of a furnace having temperature variation of less than about ±1° C.

68. A method as defined in claim 59, wherein the step of flattening comprises maintaining the thin glass article at the flattening temperature for a duration in the range of 6 minutes to 12 hours.

69. A method as defined in claim 68, wherein the step of flattening comprises maintaining the thin glass article at the flattening temperature for a duration in the range of 1 hour to 8 hours.

70. A method as defined in claim 69, wherein the step of flattening comprises maintaining the thin glass article at the flattening temperature for a duration of about 5 hours.

71. A method for making a thin fused silica article comprising:

preparing a dry gel comprising silica using a sol-gel method, the dry gel having an upper surface, a lower surface, and side edge surfaces between the upper surface and lower surface;

partially densifying the dry gel by heating the dry gel to a temperature of about 1,050° C. at a heating rate of about 25° C./hr, and maintaining the temperature of the dry gel at about 1,050° C. for about 24 hours in an atmosphere of about 7% oxygen and about 93% helium;

machining the side edge surfaces of the dry gel, so that the side edge surfaces each have a chamfered shape, the chamfered shape characterized by a chamfering angle of about 20° and a chamfering width of about 10 mm;

fully densifying the gel at a pressure of less than about 1 mTorr by heating the gel to about 1,370° C. at a heating rate of about 25° C./hr, and then maintaining the temperature of the gel at about 1,370° C. for about 4 hours in a zone in which temperature variation is less than about ±1° C., to form the thin fused silica article; and flattening the thin fused silica article by heating the article to a temperature of about 1,750° C. at a heating rate of about 300° C./hr and maintaining the temperature of the gel at 1,750° C. for about 5 hours.

* * * * *